Figure 1:
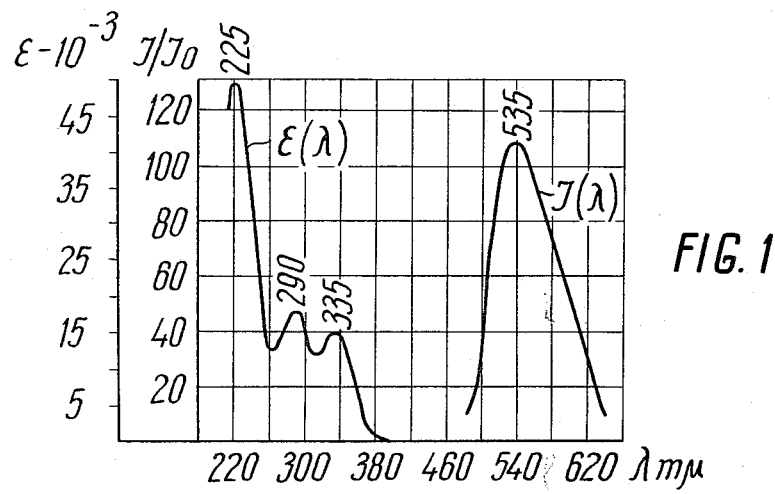

3,335,137
PROCESS OF MANUFACTURING SUBSTITUTED 2-
(2[1] - ARYLSULPHONYL AMINOPHENYL) - 4H,3,1-
BENZOXAZIN-4-ONES
Boris Markovich Bolotin, Ljudmila Stepanovna Kurnosova, Oljga Nickolaevna Koroljkova, Dora Alexandrovna Drapkina, Jaroslav Anatoljevich Terskoi, Leonid Grigorjevich Sinjaver, Vitaly Grigorjevich Brudz, and Galina Dmitrievna Jarovaja, Moscow, U.S.S.R., assignors to Vsesojuzny Nauchno-Issledovateljsky Institute Khimicheskikh Reaktivov i Osobo Chistykh Khimicheskikh Veshchestv, Moscow, U.S.S.R.
Filed Nov. 17, 1964, Ser. No. 411,816
3 Claims. (Cl. 260—244)

This invention relates to a process for producing substituted 2-(2[1]-arylsulphonyl aminophenyl)-4H,3,1-benzoxazin-4-ones of the general formula:

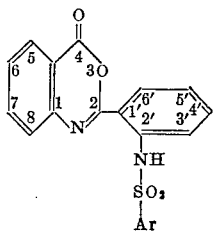

wherein Ar is an aromatic radical.

In accordance with a previously known process, 2-(2[1]-benzenesulphonyl-aminophenyl)-4H-3,1-benzoaxin-4 - one is obtained by acylation of anthranilic acid with o-nitrobenzoylchloride followed by reduction of the nitro group with titanium trichloride, cyclization of the resultant anthranoyl-anthranilic acid with the aid of thionyl chloride, and by interaction of the thusly formed O-anhydride of anthronoyl-anthranilic acid with benzenesulphonylchloride.

The disadvantages of the known process are low yield of the product and the multistage character of the process. The process is difficult to reproduce and thionyl chloride is difficult to handle.

The object of the present invention is to provide a single-stage process for the production of organic luminophores from inexpensive and readily available raw materials.

In accordance with this object, the present invention produces a process for the manufacture of 2-(2[1]-arylsulphonylamino-phenyl)-4H,3,1-benzoxazin - 4 - ones, said process comprising condensing anthranilic acid with the corresponding arylsulphonylchloride in the presence of pyridine. For this purpose, to the anthranilic acid solution in pyridine, arylsulphonylchloride is added at a mole ratio of 1:2 and at a temperature of 20 to 90° C., and the precipitate is then filtered off and dried.

The compounds obtained by this process are used as highly efficient organic yellow-green and green luminophores.

The advantages of this invention are: simplicity of the process, high yield of the product, availability and inexpensiveness of the raw material.

In order to make the invention more readily understandable to those skilled in the art the following examples are given by way of illustration.

EXAMPLE 1.—2 - [2[1] - (P - TOLUENESULPHONYL-AMINO)-PHENYL]-4H,3,1-BENZOXAZIN-4-ONE

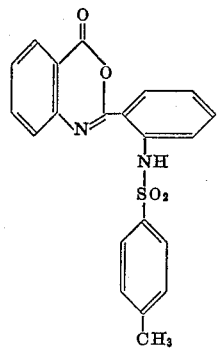

A porcelain cup containing 27.4 g. of anthranilic acid were placed into a water bath; 40 ml. of pyridine were added to the acid, with continuous agitation. In 10 to 15 minutes, i.e. on complete dissolution of the acid, cold water was poured into the bath, and another solution (76.8 g. of p-toluenesulphonylchloride in 100 ml. of pyridine) was fed into the cup over a one hour period with continued stirring (when practicing the invention on a large scale, the time of adding the coolant to maintain the assigned temperature can be increased accordingly). It is desirable to maintain the reaction temperature from 20 to 30° C., however a temperature rise even up to 60° C. does not actually influence the yield. When the addition procedure was finished, the reaction mixture was stirred for another 30 minutes.

The reaction mixture was then transferred to a Schott funnel, the precipitate separated from pyridine was washed twice with 100-ml. portions of acetone and then with a mixture of 50 ml. of acetone and 50 ml. of concentrated hydrochloric acid. While washing, the product was thoroughly agitated on the filter. The precipitate was then washed with distilled water until no acidic reaction was detected in the wash water (by Congo paper), and then again with 10 ml. of acetone.

The dehydrated product was air-dried. The yield of the product was 32.6 g., or 85% of the theoretical quantity calculated on the basis of anthranilic acid.

Product characteristics:
  Molecular weight, 392.441
  Melting point, 221° C.
  Appearance, white or yellowish crystalline powder
  Solubility (moles/lit.) is given in Table 1.

Table 1

| Solvent: | Solubility, g. mole/lit. (20° C.) |
|---|---|
| Ethyl alcohol | $<2.5 \cdot 10^{-4}$ |
| Dichloroethane | $(1.4 \pm 0.5) \cdot 10^{-2}$ |
| Chloroform | $(1.4 \pm 0.5) \cdot 10^{-2}$ |
| Dimethylformamide | $(6.1 \pm 0.2) \cdot 10^{-3}$ |
| Heptane | $<2.5 \cdot 10^{-4}$ |
| Dioxane | $(1.1 \pm 0.5) \cdot 10^{-2}$ |
| Benzene | $(3.2 \pm 0.5) \cdot 10^{-3}$ |
| Acetone | $(3.0 \pm 0.5) \cdot 10^{-3}$ |
| Water | $\ll 10^{-5}$ |

Luminescent properties: 2 - [2[1] - (p - toluenesulphonyl-amino)-phenyl]-4H,3,1-benzoxazin-4-one possesses intensive luminescence 1.7 times greater than that of 2,2¹-dioxy-1,1¹-naphthalazine. Luminescence maximum is 535 mμ; the gravity centre of the luminous flux is 550 mμ.

The simplicity of the manufacturing process and inexpensiveness of the raw materials make it possible to use luminophores in luminescent aerosols, pencils, defectoscopy, etc.

On radiation of a luminophore sample by lamp ПРК–4 ($h=25$ cm.; $i=3.75$ A.; $t=27°$ C.) for six hours, the luminescence intensity does not change.

The absorption spectrum in dichloroethane and luminescence spectrum of a given compound in a crystalline state at a temperature of $+20°$ C. is shown in FIG. 1.

Figure 2:
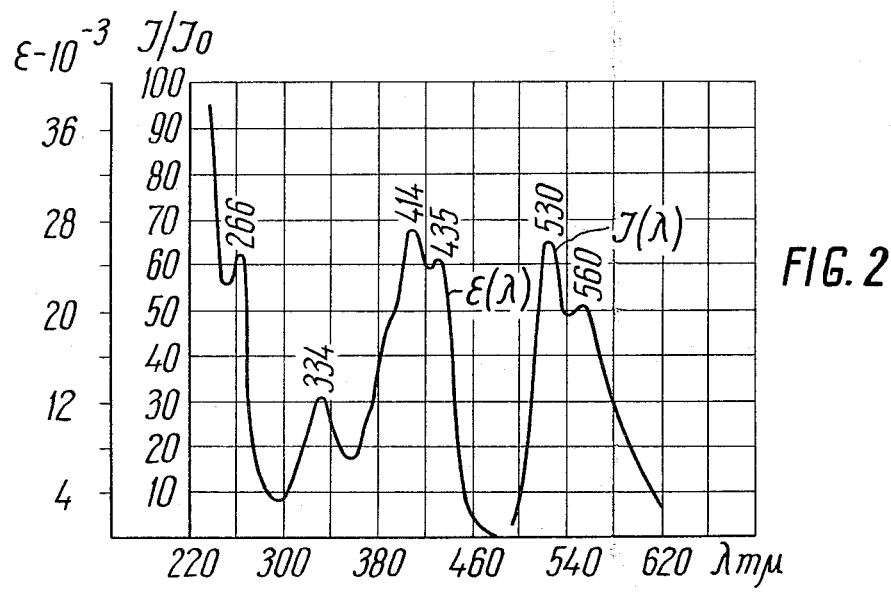
Figure 3:
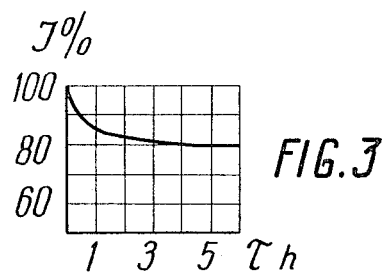

The optical properties of 2,2¹-dioxy-1,1¹-naphthalazine are given for comparison in the same units in FIGS. 2 and 3.

EXAMPLE 2.—2 - [2¹ - (2″ - NAPHTHALENESULPHONYLAMINO) - PHENYL] - 4H,3,1 - BENZOXAZIN-4-ONE

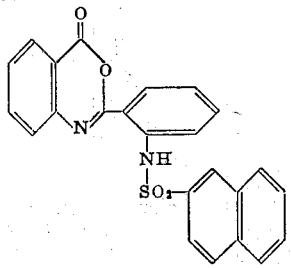

To an agitated solution of 27.4 g. (0.2 M) of anthranilic acid in 120 ml. of pyridine, 97 g. (0.4 M) of 2-naphthalenesulphonylchloride were added. 80 ml. of alcohol were added immediately after the first addition. The precipitated product was filtered and recrystallized from 600 ml. of acetone. The yield was 21.5 g.

Product characteristics:
    Molecular weight, 428.408
    Melting point, 184.185.5° C.
    Appearance, white crystalline powder
Luminescent properties: 2- [2¹-(2″-naphthalenesulphonylamino)-phenyl] -4H,3,1-benzoxazin-4-one possesses a luminescence intensity 3 times greater than that of 2,2¹-dioxy-1,1¹-naphthalazine. Maximum luminescence, 520 mμ.

The luminophore can be used for triple colour division, for the manufacture of luminescent pencils, and for luminescent defectoscopy.

Figure 4:
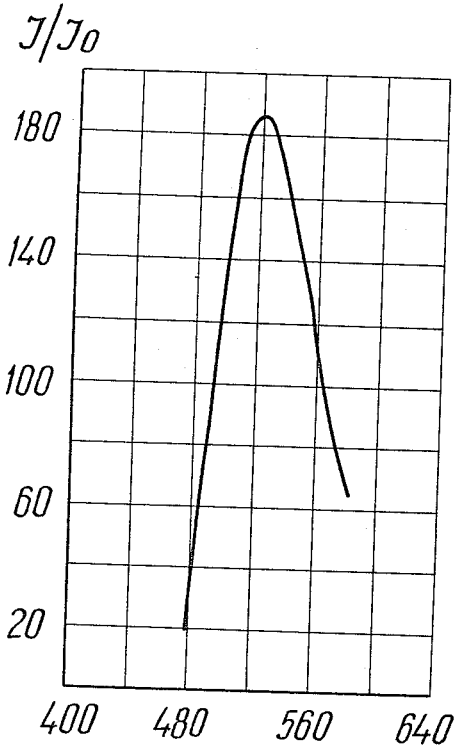

The luminescent spectrum of the powder at 20° C. is shown in FIG. 4.

EXAMPLE 3.—2-[2¹-(4″-ISOPROPYLBENZENESULPHONYLAMINO) - PHENYL] - 4-H,2.1 - BENZOXAZIN-4-ONE

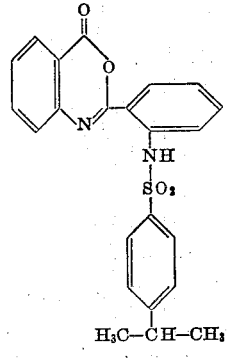

The synthesis was carried out as described in Example 1.
The yield was 60% of the theoretical quantity calculated on the basis of anthranilic acid.

Characteristics of the product:
    Appearance, white crystalline powder
    Melting point, 185° C.
    Molecular weight, 420.495

Figure 5:
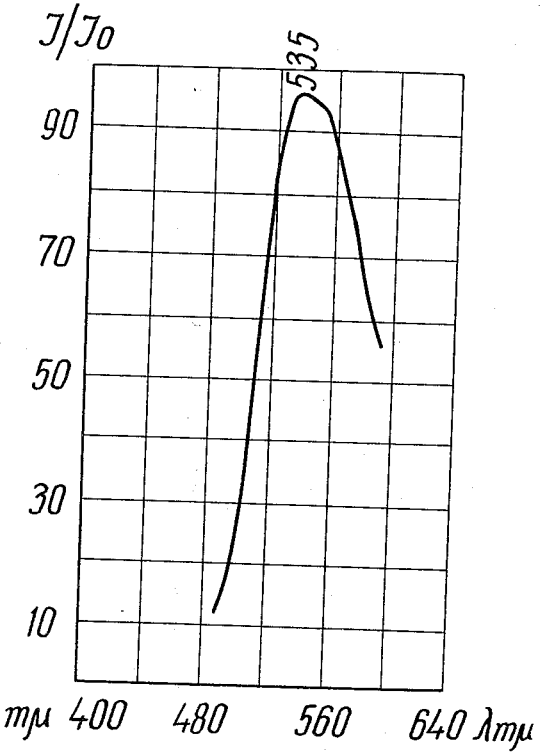

The compound is readily soluble in organic solvents. The luminescent properties are illustrated in FIG. 5.
2-[2¹-(4″-isopropylbenzenesulphonylamino) - phenyl]-4H,3.1-benzoxazin-4-one possesses intensive luminescence. Luminescence maximum, 535 mμ.

EXAMPLE 4.—2 - [2¹ - (2″,4″,6″ - TRIMETHYLBENZENESULPHONYLAMINO) - PHENYL] - 4H,3.1-BENZOXAZIN-4-ONE

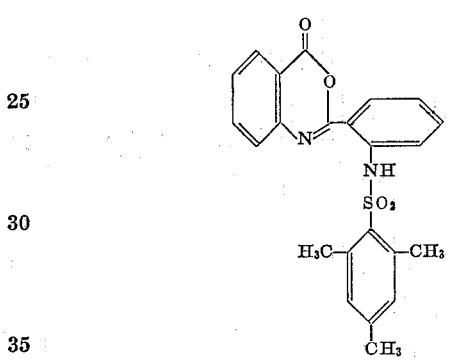

The synthesis was carried out as in Example 1.
The product yield was 80% of the theoretical quantity calculated on the basis of anthranilic acid.

Characteristics of the product:
    Appearance, white crystalline powder
    Melting point, 224° C.
    Molecular weight, 420.495

Figure 6:
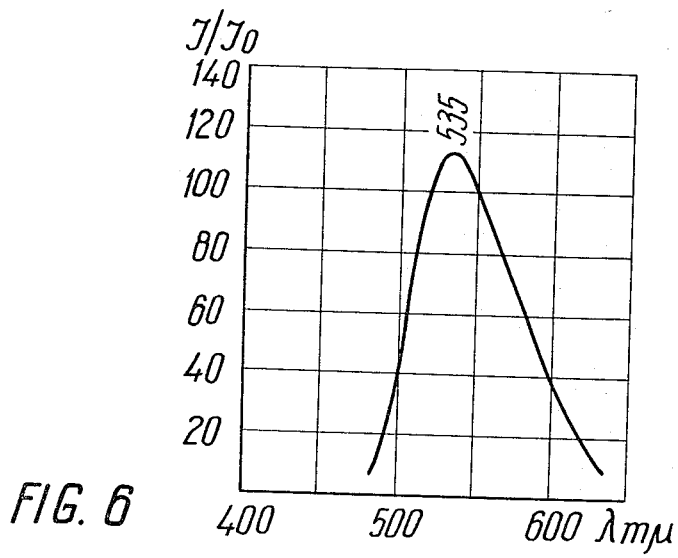

The compound is readily soluble in organic solvents. Luminescent properties are shown in FIG. 6.
2-[2¹ - (2″,4″,6″ - trimethylbenzenesulphonylamino)-phenyl] - 4H,3.1 - benzoxazin - 4 - one possesses intensive luminescence. Luminescence maximum, 535 mμ.

What we claim is:
1. A process for manufacturing substituted 2-(2¹-arylsulphonylaminophenyl)-4H,3,1-benzoxazin - 4 - ones, said process comprising condensing anthranilic acid and an arylsulphonylchloride in the presence of pyridine.
2. A process as claimed in claim 1, wherein the anthranilic acid and the arylsulphonylchloride are in a molar ratio of 1.2.
3. A process as claimed in claim 1, wherein the condensation is carried out at a temperature from 20 to 30° C.

References Cited

Schroeter et al.: "Ann. der Chem.," vol. 369, pages 134–37 (1909).

WALTER A. MODANCE, *Primary Examiner.*

ROBERT T. BOND, *Assistant Examiner.*